(No Model.) 2 Sheets—Sheet 2.

J. HYSLOP, Jr.
MACHINE FOR MAKING SHOE SHANKS.

No. 460,813. Patented Oct. 6, 1891.

Witnesses. Inventor.
Lauritz W. Möller John Hyslop Jr.
John R. Snow. by his attorneys,
Maynadier & Beach

UNITED STATES PATENT OFFICE.

JOHN HYSLOP, JR., OF ABINGTON, ASSIGNOR TO HIRAM H. JENKINS AND GEORGE O. JENKINS, BOTH OF WHITMAN, MASSACHUSETTS.

MACHINE FOR MAKING SHOE-SHANKS.

SPECIFICATION forming part of Letters Patent No. 460,813, dated October 6, 1891.

Application filed September 29, 1890. Serial No. 366,591. (No model.)

*To all whom it may concern:*

Be it known that I, JOHN HYSLOP, Jr., of Abington, in the county of Plymouth and State of Massachusetts, have invented a new and useful Machine for Making Shanks for Boots and Shoes, of which the following is a specification, reference being had to the accompanying drawings, in which—

Figure 1:
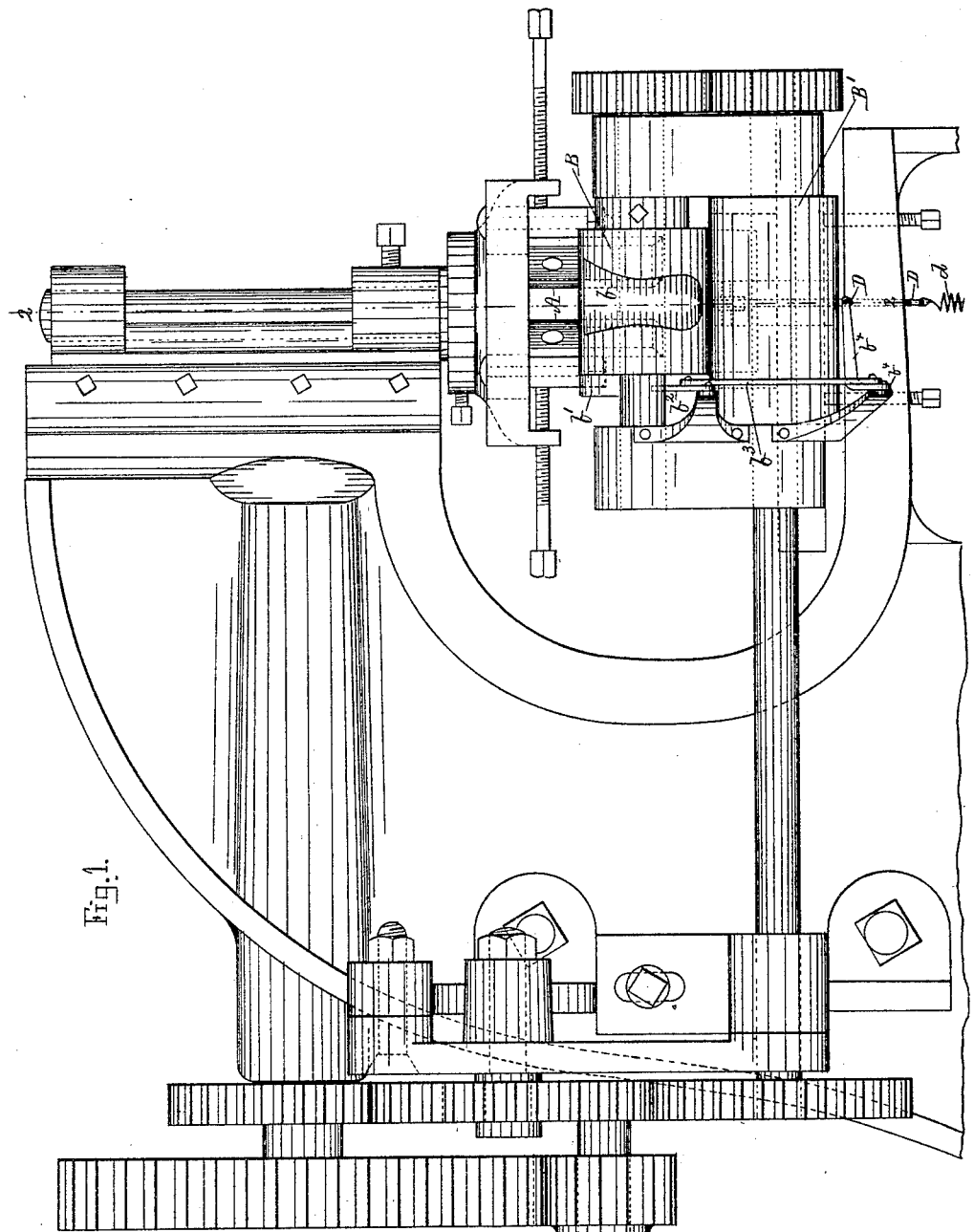
Figure 2:
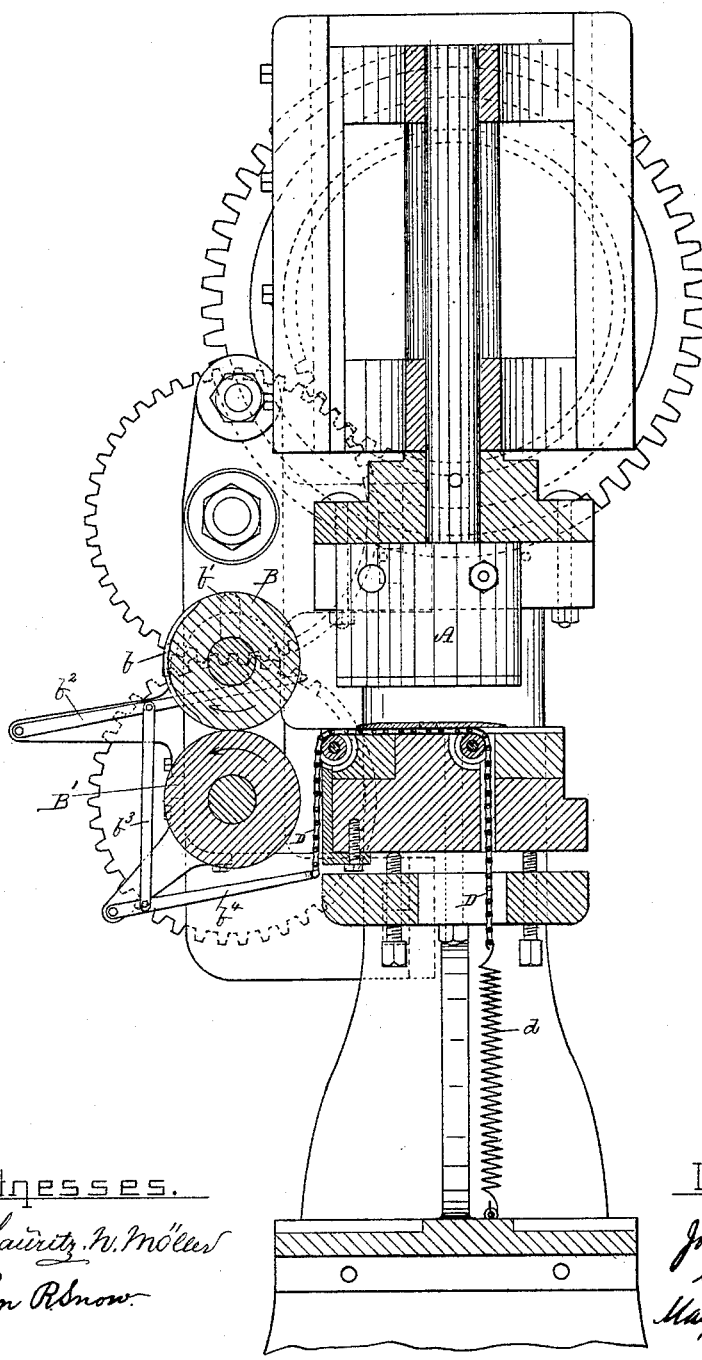

Figure 1 is an elevation; and Fig. 2, a section on line 2 2 of Fig. 1, illustrating one form of my invention.

In the drawings, A is a cutter, composed of a pair of reciprocating knives in this instance, which are too well known to require description further than to say that they cut from a strip of leather-board or like material blanks, which are usually of the outline shown by the molding-recess $b$ in roll B; but as these cutters and the mechanism for reciprocating them are not new with me, and as my invention is obviously applicable to other cutters, it is sufficient to say that they and their adjusting and operating mechanisms are familiar to all skilled in the art. The rolls B B' are also old and need no description, other than that the roll B has a recess formed in its surface of the proper shape to receive the blank cut by the cutters A and mold it to shape.

Heretofore in making shanks from leather or leather-board the cutters A constituted one mechanism and the rolls B B' a second machine, the blanks being first cut in the first machine and afterward fed by hand into the second machine; and the main feature of my invention is the combination of a cutting mechanism and a pair of rolls for shaping the blank from the cutting mechanism by means of a mechanism which receives the blanks as they are cut and conveys them to the rolls, presenting them correctly and at the proper moment to the rolls. I have already patented a machine in which a cutting and shaping mechanism is combined by means of a guideway, down which the blanks fell by gravity; but that machine differs wholly from my present machine, which is the first, so far as I know, to convey the blank positively from a cutting mechanism and deliver it at the proper time to a rolling and molding mechanism.

My conveying mechanism, as shown in the drawings, consists of a chain D or other reciprocating carrier, with studs upon its upper surface, by which the blank is connected with it. This carrier remains at rest while the cutters A sever the blank from the strip of leather board, and the action of the cutter forces the blank upon the studs, so that the blank when cut is attached to the carrier. The carrier then moves forward, carrying the blank endwise and forcing it between the rolls B B', the reciprocations of the carrier D being so timed that the end of the blank is presented to the rolls B B' at the proper moment. The blank is thus seized by the rolls and is compressed and shaped by the recess $b$ in the roll B and the smooth surface of roll B' precisely as in the shaping-machines heretofore used. The carrier D is also so timed that it returns to place under the cutters in time to have the next blank cut forced down upon its prongs.

The strip from which the blanks are cut is of a width equal to the length of the blanks, and this strip is fed lengthwise across the carrier D, so that the blank to be cut when in position under the cutters extends lengthwise along and over the carrier, and after the blank is severed it is forced upon the studs, and the carrier will present it endwise to the rolls B B', the line of motion of the carrier being across the line of motion of the strip from which the blanks are cut.

The advantages of my machine will be obvious, for one attendant can do the work of two, and the work of the attendant is simply feeding the leather-board strip to the cutters.

It will be clear that the carrier D can be reciprocated by a variety of devices familiar to constructers of machinery; but the simplest contrivance of the many I have contemplated is the cam $b'$, which wipes upon lever $b^2$, and the motion of lever $b^2$ moves lever $b^4$ through link $b^3$, lever $b^4$ carrying with it chain D against the force of spring $d$, the spring $d$ returning chain D to place as cam $b'$ rotates.

The operation will be clear without further description.

I am aware of the patent to Moore, No. 111,863, dated February 14, 1871, and disclaim all there shown, for my combination of elements constitutes a machine of a different class from that shown in Moore's patent, for the reason that the three mechanisms of that patent are each intermittent, while in mine the cutters and the carrier are intermittent; but the rolls rotate continuously, and the blank requires to be fed endwise between the rolls, so that its entering end shall always strike a certain definite part of the rolls, and there is nothing resembling this in any prior machine.

What I claim as my invention is—

In combination, cutters A, carrier D, and rolls B B', with mechanism for reciprocating the cutters and the carrier and rotating the rolls, all combined and operating substantially as described.

JOHN HYSLOP, JR.

Witnesses:
J. E. MAYNADIER,
JOHN R. SNOW.